Sept. 8, 1970 A. W. PENNEY, JR 3,527,952

TRANSMISSION LINE ASSEMBLY FOR PHOTOTRANSDUCER

Filed March 3, 1967 2 Sheets-Sheet 1

INVENTOR.
ALBERT W. PENNEY JR.

BY Melvin Pearson Williams
ATTORNEY

Sept. 8, 1970 A. W. PENNEY, JR 3,527,952

TRANSMISSION LINE ASSEMBLY FOR PHOTOTRANSDUCER

Filed March 3, 1967 2 Sheets-Sheet 2

United States Patent Office 3,527,952

Patented Sept. 8, 1970

3,527,952

TRANSMISSION LINE ASSEMBLY FOR PHOTOTRANSDUCER

Albert W. Penney, Jr., Glastonbury, Conn., assignor to United Aircraft Corporation, East Hartford, Conn., a corporation of Delaware Filed Mar. 3, 1967, Ser. No. 620,344
Int. Cl. H01j *39/12*
U.S. Cl. 250—206 6 Claims

ABSTRACT OF THE DISCLOSURE

A central conducting block has one end of a central bore in contact with the anode of a photodiode, the cathode of which is connected through the central conductor of a coaxial transmission line (the outer conductor comprising said conducting block) via a coaxial L pad to a coaxial plug assembly. The outer conductor of the coaxial plug assembly is connected through an outer cover structure to one side of one or more low impedance transmission lines, the other side of which are in electrical contact with the main conducting block and are in turn coupled to a high-voltage source to provide high-working voltage to the diode. Resiliently disposed optical filter means are readily interchangeable.

CROSS-REFERENCES TO RELATED APPLICATIONS

Low impedance tranmission line power sources suitable for use in the phototransducer disclosed herein and described and claimed in my copending application entitled Picosecond Energy Source, Having Transmission Line Coupling of Non-Critical Power Supply, Ser. 620,375, filed on even date herewith.

BACKGROUND OF THE INVENTION

Field of invention

This invention relates to phototransducers and to transmission lines and more particularly to a compact phototransducer capable of monitoring light pulses having rise times in the picosecond range.

Description of the prior art

A variety of phototransducers are currently available. These transducers are, however, characterized by high cost, undue bulk, and a limited frequency response. These limitations become critical in certain applications. For instance, in monitoring the pulse-shaped characteristics of a laser, the phototransducer must be capable of physically fitting in with the laser equipment so as to present the photoreceiving surface to receive light from the laser without displacing other necessary equipment. Additionally, lasers and other sources are capable of providing pulses of extremely short duration, which may have rise times in the picosecond range. Whenever currently-available transducers are used, it is impossible to detect the rise time of the laser or other light source since the response characteristic of the photodiode will limit the usable signal according to the characteristic of the photodiode rather than according to the actual wave shape of the source of light.

In order to provide improved electronic equipment, such as a phototransducer in accordance herewith, it is necessary to provide a variety of improved components. A well-known problem is providing adequate physical characteristics in an ever increasingly small amount of space as technological improvements demand smaller equipment, in as the range of useful frequencies continues to increase, thereby requiring shorter and shorter electrical circuit paths. It is therefore necessary to provide maximum electrical capability in a minimum of space in many applications.

SUMMARY OF INVENTION

An object of the present invention is to provide a low cost, compact, high-speed phototransducer.

Another object of the present invention is to provide a compact aggregate of a plurality of parallel plate electrical devices.

In accordance with the present invention, a switch device such as a photodiode is connected in series, by means of a first transmission line, to a second transmission line and a load assembly. Accordingly. to another aspect of the present invention, the second transmission line is folded onto the outer conductor of the first transmission line, and comprises a low impedance source of high voltage to operate the photodiode. According to further aspects of the present invention, the apparatus is so constructed as to permit easy removal of a photodiode by means of a central bore in said first transmission line. Further features of the invention include readily changeable resiliently disposed filter elements for limiting the light sensed by said photodiode.

Other objects, features and advantages of the present invention will become more apparent in the light of the folowing detailed description of preferred embodiments thereof, as illustrated in the accompanying drawings.

DESCRIPTION OF THE PREFERRED EMBODIMENT

Figure 1:
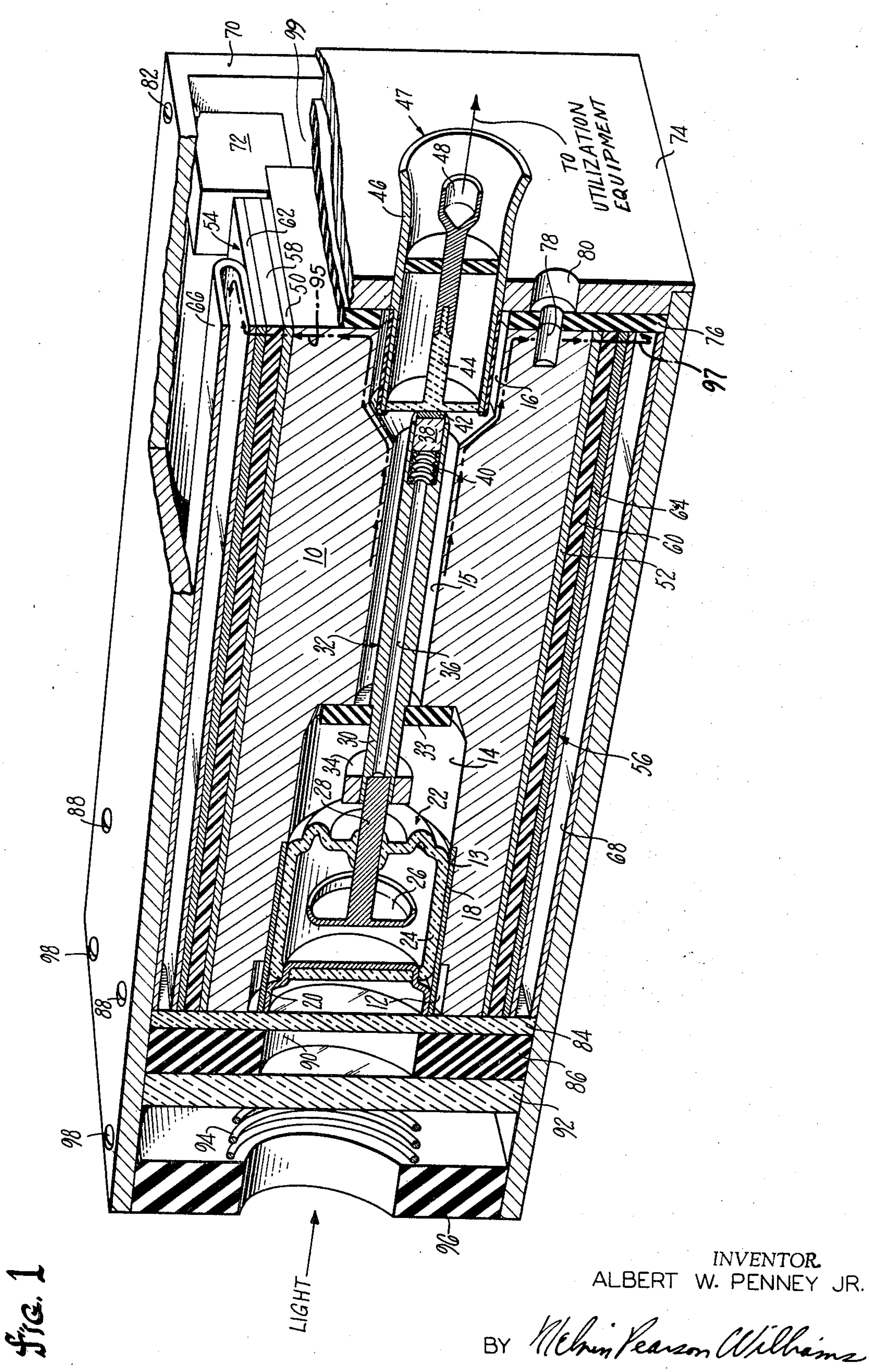
FIG. 1 is a sectioned perspective, partially broken away, of a phototransducer in accordance with the present invention.

Referring now to FIG. 1, an embodiment of the present invention includes a central conductive block 10, having a plurality of bores 12–16 therein, and about which the unit is assembled. The bore 13 has disposed therein a resilient sleeve or spring structure 18 which permits the anode 20 of a switch device such as a photodiode 22 to form a wiping contact and to be resiliently held in place. The surfaces of the resilient sleeve or spring structure 18 also receive the glass envelope 24 of the photodiode 22. The bore 12 permits a slight outward expansion of the resilient structure 18 as a result of the insertion of the photodiode therein.

The photodiode 22 includes a cathode 26 which is connected by a central conductor 28 through the glass wall 24 of the photodiode 22 to a central conductor 30 of a coaxial transmission line 32 which is formed within the bore 15. Disposed about the central conductor 30 is a mass of ferrite 34 which provides impedance mismatch compensation between the coaxial transmission line 32 and the photodiode 22. This impedance mismatch compensation is known in the art. The central conductor 30 of the transmission line 32 has a center bore 36 which permits the insertion of a rod for pushing the photodiode loose from its position, thereby facilitating change in diodes as necessary. The central conductor may be supported by an insulator 33. At the right-hand end (as viewed in FIG. 1) of the transmission line 32, a counterbore in the center conductor 30 accommodates a contact member 38 which is resiliently urged by a spring 40 into electrical contact with a contact piece 42 so as to make electrical contact between the central conductor 30 and a coaxial L pad impedance matching device 44. Impedance matching device 44 provides a termination impedance for a coaxial connector which includes an outer conductor 46 and an inner conductor 48, which may take any one of many well-known forms of connectors available in the art. The central conductor 48 of the connector 47 is, therefore, directly connected to the center conductor 30 of the transmission line 32, and is thus in communication with the cathode 26 of the photodiode 22.

Disposed adjacent to, and in electrical contact with the block 10 are the conducting plates 50, 52 of a plurality of transmission lines 54, 56, which include dielectric layers 58, 60 and outer conducting plates 62, 64, respectively. In contact with the outer plates 62, 64 of the transmission lines 54, 56 are a related pair of elongated contact springs 66, 68. Each of these springs are also in contact with respective portions of a conducting outer case structure 70, which may comprise a single hollow square tube. The central block 10 and transmission lines 54, 56 are disposed relative to outer case 70 by insulating spacer blocks 72. The right-hand end of the phototransducer (as viewed in FIG. 1) is capped with a conducting plate 74 which is spaced from the block 10, the transmission lines 54, 56 the contact springs 66, 68 and the spacer blocks 72 by a layer of insulation 76. The end plate 74, the layer of insulation 76 and the central block 10 are bored to receive a high-voltage connector, as is simply illustrated in FIG. 1 by a hole 78 which may receive a positive high voltage central conductor, and a counterbore 80 which may receive an outer negative high-voltage conductor; the means 78, 80 for receiving high voltage and applying it between the end plates 74 and central block 10 are illustrative merely, and any well-known suitable arrangement may be used so as to impress a voltage therebetween. The end plate 74 may be secured to outer case structure 70 by any suitable means, such as by a plurality of screws as illustrated by screw 82.

At the left-hand end of the phototransducer as viewed in FIG. 1, the photodiode 22 may be sealed off by a transparent plate 84, which may comprise glass or a suitable plastic. Preferably, the plate 84 has a light diffusing capability. To hold the assembly together, an insulator bock 86 is fastened to the outer case structure 70 by any suitable means such as by a plurality of screws 88. A filter means 92 is resiliently urged against the insulator block 86 by suitable means such as a coil spring 94, the other end of which abuts against another insulator block 96 which may be fastened to the outer case 70 by any suitable means such as a plurality of screws 98. The blocks 86, 96 may be made of metal or other material if desired. The structure 84–96 may be removed (along with connector 47) for diode replacement.

Operation of the device depends upon the application of a high voltage across the photodiode, and light energy incident on the anode of the photodiode 22. The transmission lines 54, 56 are utilized to store energy from a power supply, and to deliver the energy into the system when the photodiode conducts, thereby permitting a fast rise time electrical signal to result, which signal can very nearly follow the optical energy incident upon the photodiode. This is in accordance with the teachings in my aforementioned copending application. When the light strikes the diode 22, the diode will conduct, and an electromagnetic wave will be launched down the transmission line 32, toward the right as viewed in FIG. 1. The path along the central conductor is rather obvious in that it travels from the central conductor 30 through the contact member 38 and contact piece 42 into the L pad 44 and thence into the central conductor 48 of the connector 47. The path for the outer conductor is less obvious, and it includes travel along the edges of the bore 15 within the block 10 to the right, and then along the edges of the block 10, as shown roughly by dotted arrow configuration 95, to the transmission line 54 and otherwise downwardly along the edges of the block 10 (arrow configuration 97) to the transmission line 56. The wave will then travel through the transmission lines, and through the respective contact springs 66, 68 into the outer case 70, through the end plate 74, and to the outer conductor 46 of the connector 47. In other words, the characteristic impedance of the transmission lines 54, 56 are in parallel with each other, and this parallel combination is in series with the outer conductors of the transmission lines 32, 47.

Because of the high frequencies involved, which have periods in the nanosecond and picosecond range of times, the skin effect of radiation is quite noticeable, and, therefore, the energy travels along the edge surfaces of conductors rather than directly through the conductors as is true of energy at a lower frequency. Thus, the energy from the photodiode tends to flow through the ends of the contact springs 66, 68 rather than completely through the entire volume of the contact springs. The path, however, will not be directly on the end, but just inward therefrom (95, 97) some amount, so as to achieve a path of minimum inductance, which minimum inductance is provided by the mass of conducting material between this conducting area and the end of the contact springs 66, 68. The purpose of the full length contact springs 66, 68 is, therefore, not to provide conductability to all parts of the transmission lines 54, 56, but rather to fill an area above and below, respectively, the transmission lines 54, 56 with sufficient conducting material so as to keep the inductance in series with the transmission lines 54, 56 as low as possible. This same purpose dictates that the insulator plate 76 be a thin as possible, conducive to good high-voltage properties so as to provide a minimum of nonconducting area within which magnetic fields could be established; this also will tend to keep inductance in series with the transmission lines 54, 56 a minimum in the region of the end plate 74.

Figure 2:
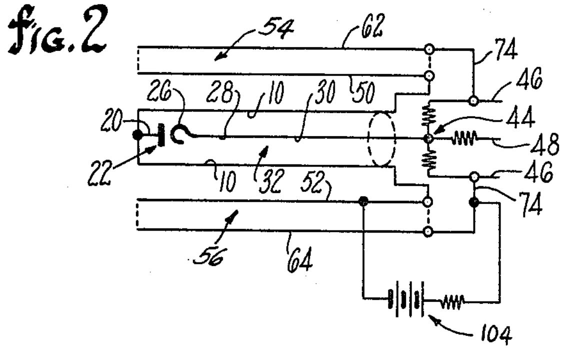
FIG. 2 is a schematic diagram of the equivalent electrical circuit of the apparatus illustrated in FIG. 1.
Figure 3:
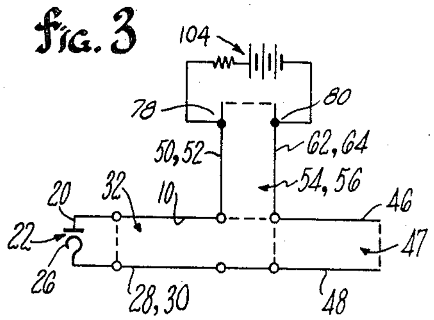
FIG. 3 is a schematic representation illustrating in simplified form the equivalent circuit of FIG. 2.

Referring to FIGS. 2 and 3, the equivalent schematic electrical circuit, drawn in FIG. 2 in the same general configuration as the apparatus of FIG. 1, is shown in the simplest form in FIG. 3. Therein, the diode 22 is shown connected by transmission line 32 to the series combination of the transmission lines 54, 56 and the transmission line 48.

Thus, the diode 22 comprises a switch device connected across the distal ends of a first conductor 10 and a second conductor 28, 30 of a first transmission line 32; the proximal end of said first conductor 10 being connected to a proximal end of a first conductor 50, 52 of a second transmission line, and the proximal end of said second conductor 28, 30 being connected to the proximal end of a second conductor 48 of a third transmission line 47. The second conductor 60, 64 of said second transmission line 54, 56 has its proximal end connected to the proximal end of a first conductor 46 of the third transmission line 47. A load or utilization device may be plugged into the connector formed by the distal end of the third transmission line 47 in order to display or otherwise utilize the output of the circuitry. A power source 104 is illustrated as being connected to the opposite sides of the second transmission line 54, 56; however, because of the nature of the relationshipship between the power source 104 and the transmission lines illustrated in simplified equivalent circuit form in FIG. 3, it is immaterial at what point (in the high frequency transmission line sense) the power source 104 is actually interconnected. Thus although shown being connected near the distal end of the second transmission line 54, 56 in the simplified equivalent circuit of FIG. 3, one point of connection 78 can be located anywhere along the DC conductivity path including the conductors 10 and 50, 52 and the other connection point 80 can be anywhere along the DC path comprising conductors 62, 64 and 46. This is so because the power source charges the transmission line over a relatively long period of time in contrast with the period of time at which the operation of the switching device such as diode 22 will discharge the line. Thus, although contact point 78 is actually within block 10 and contact point 80 is in the cover plate 74, these two contacts are capable of connecting the power source across the second transmission line which comprises the parallel combination of transmission lines 54 and 56 in this embodiment. In the simplified equivalent circuit of FIG. 3, the second transmission line 54, 56 comprises two lines connected in parallel, which are individually shown in the equivalent circuit of FIG. 2 more in the fashion in which the device is actually constructed as shown in FIG. 1. However, as is well known in the art, connection of plural transmission lines in parallel alters only the net characteristic impedence, but the equivalent circuitry sees the parallel combination as a single transmission line as illustrated in FIG. 3.

Figure 4:
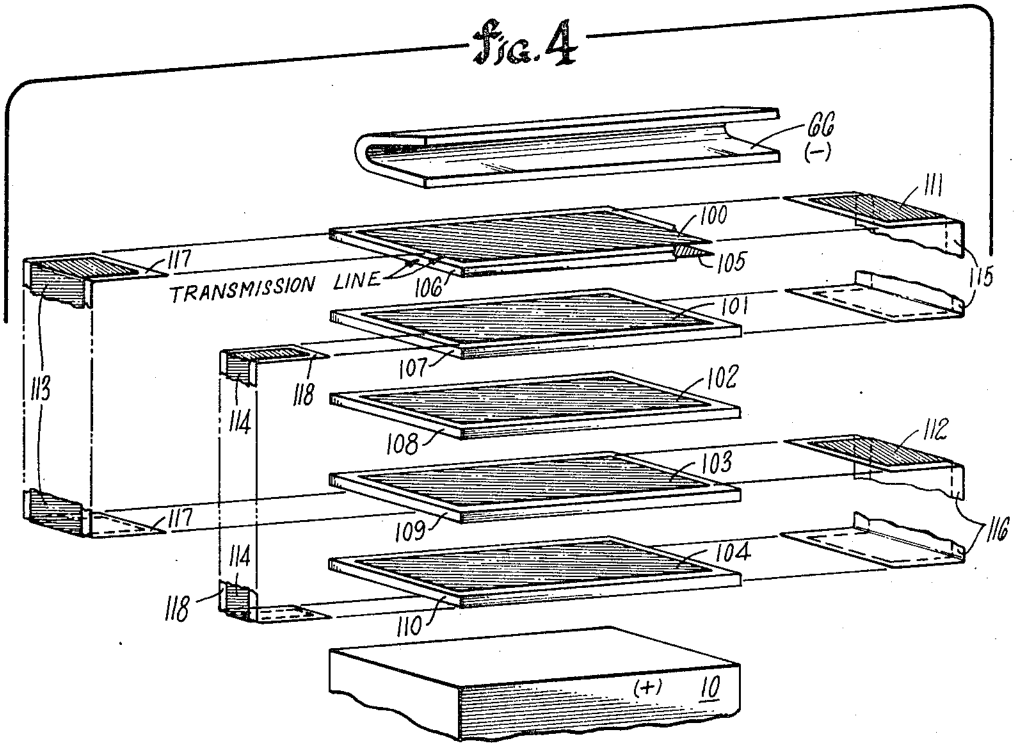
FIG. 4 is an expanded perspective of another embodiment of a low impedance transmission line suitable for use in the apparatus of FIG. 1.

A variation of the transmission lines 54, 56 is illustrated in FIGS. 4–7. Therein, instead of the transmission lines 54, 56 comprising a pair of plates 50 (52), 62 (64), a transmission line for use in the transducer of FIG. 1 in accordance with the embodiment of FIGS. 4–7, comprises a plurality of separate transmission lines connected in parallel. In FIG. 4, each transmission line comprises a plurality of plates 100–105 (and additional plates not shown in FIG. 4 opposite to and corresponding with plates 101–104, respectively). The conductive plates 100–105 are separated by related layers of dielectric material 106–110. The conductive plates 100–105 are uncoated, and thereby able to make electrical contact with adjacent conductive plates. Thus, plate 100 is in contact with spring contact 66, and a plate opposite to and related to plate 104 is in electrical contact with the block 10. From FIG. 4, it is apparent that if the transmission lines were stacked between the spring contact 66 and the block 10 (as viewed in FIGS. 5 and 6), they would represent a plurality of series elements between the spring contact 66 and block 10. However, a plurality of connections, such as copper strips 111–114, are used to interconnect opposite sides of alternate transmission lines in the sequence, to common points of potential. In the apparatus of FIG. 1, the use of the photodiode requires that the spring contacts 66, 68 be at a negative potential and requires that the block 10 be at a positive potential. In FIG. 4, therefore, one may consider the spring contact 66 to be negative and the block 10 to be positive, thus the plate 100 will be negative since it directly contacts the block 66. Also, the plate opposite plate 101, as well as plate 102, will be made negative by the copper strip 111 which contacts the spring contact 66 and plate 102, plate 102 in turn being in contact with the plate opposite to plate 101. Additionally, copper strip 113 will interconnect the spring contact 66 with plate 104 so that plate 104 and the plate opposite to plate 103 will be at the negative potential. In a similar fashion, the positive potential of block 10 is directly in contact with the plate opposite plate 104, and is connected to the opposite plate 102 by copper strip 112 as well as to plate 105 by copper strip 114. In order to provide good high-voltage insulation between the plates 100–105 and the copper strips 111–114, a plurality of corresponding insulator strips 115–118 isolate the copper strips from the ends of various transmission lines so that contact will be made only as desired, and thus avoiding voltage breakdown between the ends of plates and copper strips of opposite polarity.

Figure 5:
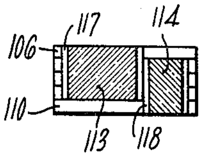
FIG. 5 is a side elevation illustrating the left end of the apparatus shown in FIG. 4.
Figure 6:
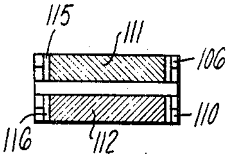
FIG. 6 is a side elevation illustrating the right end of the apparatus shown in FIG. 4.
Figure 7:
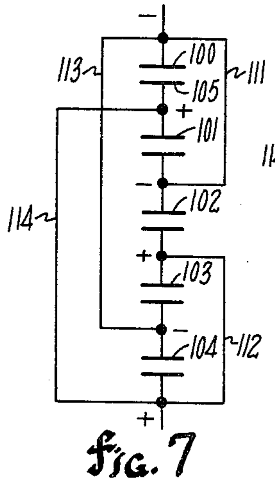
FIG. 7 is a schematic illustration of the electrical connection of the apparatus of FIG. 4.
Figure 8:
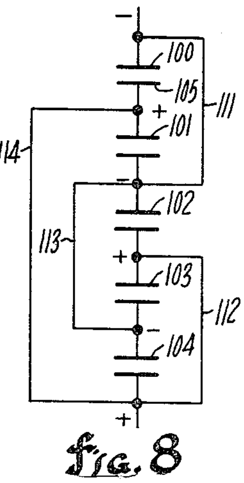
FIG. 8 is a schematic illustration of a variation in the embodiment of FIGS. 4–7.

An alternative to the embodiment shown in FIGS. 4–7 is illustrated in FIG. 8. Therein, a copper strip 113 would make contact with the plate opposite to plate 101 rather than directly with the spring contact 66. This has the advantage that there is no need to avoid crossover as in the embodiments of FIGS. 4–7 where the copper strip 113 must share the lateral space with strip 114, as illustrated in FIG. 5. Instead, in the embodiment of FIG. 8, a copper strip corresponding to copper strip 113 could be a full width and completely contained within the copper strip 114, which could also be a full width (full width meaning the large size apertaining to strips 111 and 112 as shown in FIG. 6).

As described and claimed in my aforementioned copending application, a different dielectric material may be used for one of the dielectrics 106–110, than that which is used for another of them. In fact, all of the dielectrics 106–110 could be of one type except one of them, and that one could be of a different type. Altentatively, all five could be of different materials, or there could be two or three of two different materials, et cetera. This has the advantage of allowing the highest possible dielectric materials to be used to accommodate frequencies up to a certain critical frequency, after which that high dielectric would acquire a characteristic of very high losses. It would be possible to also use a different dielectric material having a lower dielectric constant, but which would not have such high losses above that critical frequency. In other words, the characteristics of a total effective transmission line could be averaged out to give a broad band characteristic over a range of frequencies, which is less than optimum for some frequencies, but sufficient for all the frequencies at which the device is to be used. A similar situation is obtained with respect to the embodiment of a phototransducer shown in FIG. 1, wherein the different transmission lines 54–56 may have different dielectric materials. Only two transmission lines 54, 56 have been illustrated in FIG. 1; however, the configuration permits four distinct transmission lines devices to be inserted, at the space occupied in FIG. 1 by transmission lines 54, 56 and within a region denoted by reference numeral 99, as well as in an area (not shown because of sectioning) which is laterally opposite the area 98. Furthermore, as described hereinbefore, the four transmission line devices 54, 56 etc., may each comprise a plurality of transmission lines connected in parallel in accordance with the embodiments of FIGS. 4–8. Thus, a wide range of transmission line impedance, high voltage capability, and dielectric response are available within the framework of the device illustrated in FIG. 1.

Although the invention has been shown and described with respect to preferred embodiments thereof, it should be understood by those skilled in the art that various changes and omissions in the form and detail thereof may be made therein without departing from the spirit and the scope of the invention.

Having thus described preferred embodiments of my invention, what I claim as new and desire to secure by Letters Patent of the United States is:

1. An electric circuit arrangement comprising first, second and third transmission lines, each having two conductors, a first end of each of said transmission lines being in mutual proximity with a first end of the other transmission lines, one conductor of said second transmission line being connected at its proximal end with the proximal end of a first conductor of said first transmission line and the other conductor of said second transmission line being connected at its proximal end to the proximal end of a first conductor of said third transmission line, the proximal ends of the second conductors of said first and third transmission lines being connected together, a switch device connected across the two conductors of said first transmission line at its distal end, a source of power connected electrically across the two conductors of said second transmission line, the distal ends of the two conductors of said third transmission line being adapted to be connected to a signal utilization means, whereby said second and third transmission lines are connected in electric series circuit relationship across said first transmission line, said second transmission line supplying energy to said first and third transmission lines in response to operation of said switch device.

2. The circuit described in claim 1 wherein said first transmission line comprises a block of conductive material bored to receive said switch device and having a central aperture therein, said central aperture containing a central conductor spaced apart from said block.

3. The circuit described in claim 2 wherein said bore to receive said switch device defines an impedance matching section including means for compensating for the mismatch between the impedance of said first transmission line and the impedance of said switch device.

4. The circuit in accordance with claim 2 wherein substantially all of the area of one face of said first conductor of said second transmission line is disposed adjacent to and in electrical contact with said block.

5. The circuit described in claim 4 additionally comprising an outer case structure;

and wherein said second conductor of said second transmission line is disposed in closely spaced relation and electrical contact with said outer case structure.

6. The circuit described in claim 4 additionally comprising a conducting case structure;

and wherein said second conductor of said third transducer is in electrical contact with said conducting case structure.

References Cited

UNITED STATES PATENTS

| | | | |
|---|---|---|---|
| 2,676,309 | 4/1954 | Armstrong | 333–84 |
| 3,162,717 | 12/1964 | Lentz | 333—84 X |
| 3,217,274 | 11/1965 | Alford | 333—26 |

PAUL L. GENSLER, Primary Examiner

U.S. Cl. X.R.

307—311; 333—84